United States Patent [19]

Brown

[11] Patent Number: 5,253,628
[45] Date of Patent: Oct. 19, 1993

[54] INTERNAL COMBUSTION ENGINE FUEL PICKUP AND RESERVOIR

[75] Inventor: Bradley A. Brown, Metamora, Mich.

[73] Assignee: Ford Motor Company, Dearborn, Mich.

[21] Appl. No.: 910,925

[22] Filed: Jul. 9, 1992

[51] Int. Cl.5 .................. F02M 37/04; E03B 11/00
[52] U.S. Cl. .................... 123/516; 123/518; 137/576
[58] Field of Search ............... 123/516, 514, 510, 512, 123/509, 497, 518; 137/576, 572, 571, 574, 565

[56] References Cited

U.S. PATENT DOCUMENTS

| 1,189,479 | 7/1916 | Pfouts . | |
| 2,414,158 | 1/1947 | Mock | 123/516 |
| 3,020,950 | 2/1962 | Schraivogel . | |
| 3,672,537 | 6/1972 | Kitzer | 123/518 |
| 3,773,091 | 11/1973 | Boyd et al. . | |
| 3,844,264 | 10/1974 | Grainger | 123/518 |
| 4,142,470 | 3/1979 | Zauss . | |
| 4,279,232 | 7/1981 | Schuster | 123/516 |
| 4,503,885 | 3/1985 | Hall . | |
| 4,541,395 | 9/1985 | Gieger . | |
| 4,747,388 | 5/1988 | Tuckey . | |
| 4,796,593 | 1/1989 | Woodcock et al. . | |
| 4,893,647 | 1/1990 | Tuckey . | |
| 4,899,784 | 2/1990 | Woodgate et al. . | |
| 4,928,657 | 5/1990 | Asselin . | |
| 4,986,318 | 11/1991 | Yun . | |
| 4,989,572 | 2/1991 | Giacomazzi et al. . | |
| 5,014,742 | 5/1991 | Covert et al. . | |
| 5,050,567 | 9/1991 | Suzuki | 123/514 |
| 5,070,849 | 12/1991 | Rich | 123/576 |
| 5,103,793 | 4/1992 | Riese | 123/510 |
| 5,137,002 | 8/1992 | Mahoney | 123/516 |
| 5,139,000 | 8/1992 | Sawert | 123/514 |
| 5,146,901 | 9/1992 | Jones | 123/516 |
| 5,203,306 | 4/1993 | Dillineshey | 123/518 |

FOREIGN PATENT DOCUMENTS 278656 1/1928 United Kingdom ............... 123/516

Primary Examiner—Carl S. Miller
Attorney, Agent, or Firm—Jerome R. Drouillard; Roger L. May

[57] ABSTRACT

A fuel reservoir system for an internal combustion engine includes a canister (22) having a storage volume (24) for holding fuel, at least one fuel supply line (26) extending from the canister to the engine, an entrance pipe (28) for conducting raw fuel into the canister, and an exit pipe (32) connected with a fuel supply line for conducting fuel from the canister to the fuel supply line. The exit pipe includes a draft tube (34) extending into the lower part of the storage volume, a purge passage (36) communicating the upper portion of the draft tube with the storage volume, and a flow restrictor (38,40) mounted in the draft tube upstream of the purge passage.

16 Claims, 3 Drawing Sheets

INTERNAL COMBUSTION ENGINE FUEL PICKUP AND RESERVOIR

BACKGROUND AND SUMMARY OF THE INVENTION

Many automotive fuel tanks are flat in shape and, as a result, movement of the vehicle may cause the fuel pump pickup to become uncovered. When this happens, the engine's lift pump may draw air into the fuel system, with the result that the engine may stall or run roughly. In an effort to prevent such stalling caused by the ingestion of air in the fuel system, vehicle designers have used a reservoir about the fuel pump pickup. Such a reservoir is disclosed in U.S. Pat. No. 4,899,784 to Woodgate et al.

If a reservoir is used for the purpose of helping to maintain fuel about a pickup, keeping the reservoir filled may be a problem. The '784 patent cited above uses a return line from the engine to induce flow into the reservoir. This system suffers from a drawback which is shared by all such reservoirs insofar as the reservoir can fill only to the extend that fuel is actually running through the system. In other words, if the engine is either starved for fuel or air bound, the filling mechanism will not help.

It is an advantage of the present advantage that a fuel pickup and reservoir according to this invention will allow the engine to keep running even at very low levels of fuel in the fuel tank and, of equal importance, it will allow the engine's fuel system to purge itself of air if the engine is operated until the fuel pickup is uncovered such that air has been ingested into the system.

According to the present invention, a fuel reservoir system for an internal combustion engine comprises a canister (22) having a storage volume (24) for holding fuel, at least one fuel supply line (26) extending from the canister to the engine, an entrance pipe (28) for conducting raw fuel into the canister, and an exit pipe (32) connected with a fuel supply line for conducting fuel from the canister to the fuel supply line. The exit pipe comprises a draft tube (34) extending into the lower part of the storage volume, a purge passage (36) communicating the upper portion of the draft tube with the storage volume, and a flow restrictor (38,40) mounted in the draft tube upstream of the purge passage.

DETAILED DESCRIPTION OF THE PREFERRED EMBODIMENTS

Figure 1:
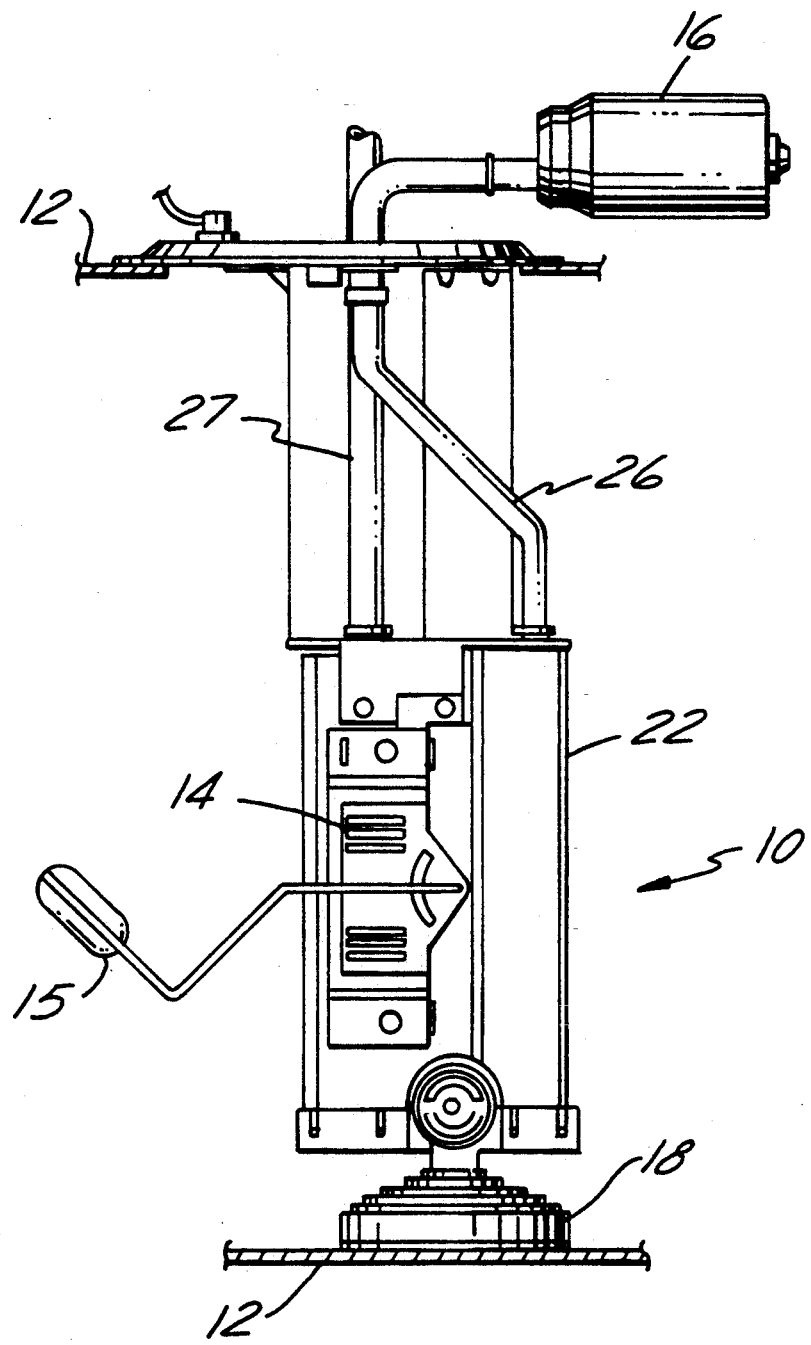
FIG. 1 is a schematic representation of a fuel system according to the present invention.

As shown in FIG. 1, a fuel pickup and reservoir assembly, 10, is located within the fuel tank 12. A fuel level sender, 14, having a float, 15, may be provided for the purpose of advising the operator of the internal combustion engine as to the amount of fuel remaining in the fuel storage tank. In response to a vacuum pulled by pump 16, fuel enters fuel pickup and reservoir assembly 10 via a lift boot, 18. Thereafter, the fuel passes through boot 18 and canister 22, and out of the pickup and reservoir assembly through fuel supply line 26 and into fuel pump 16. Fuel leaving pump 16 moves to the engine (not shown) and returns from the engine via fuel return line 27. Details of the construction of the fuel pickup and reservoir assembly are shown in FIG. 2.

Figure 2:
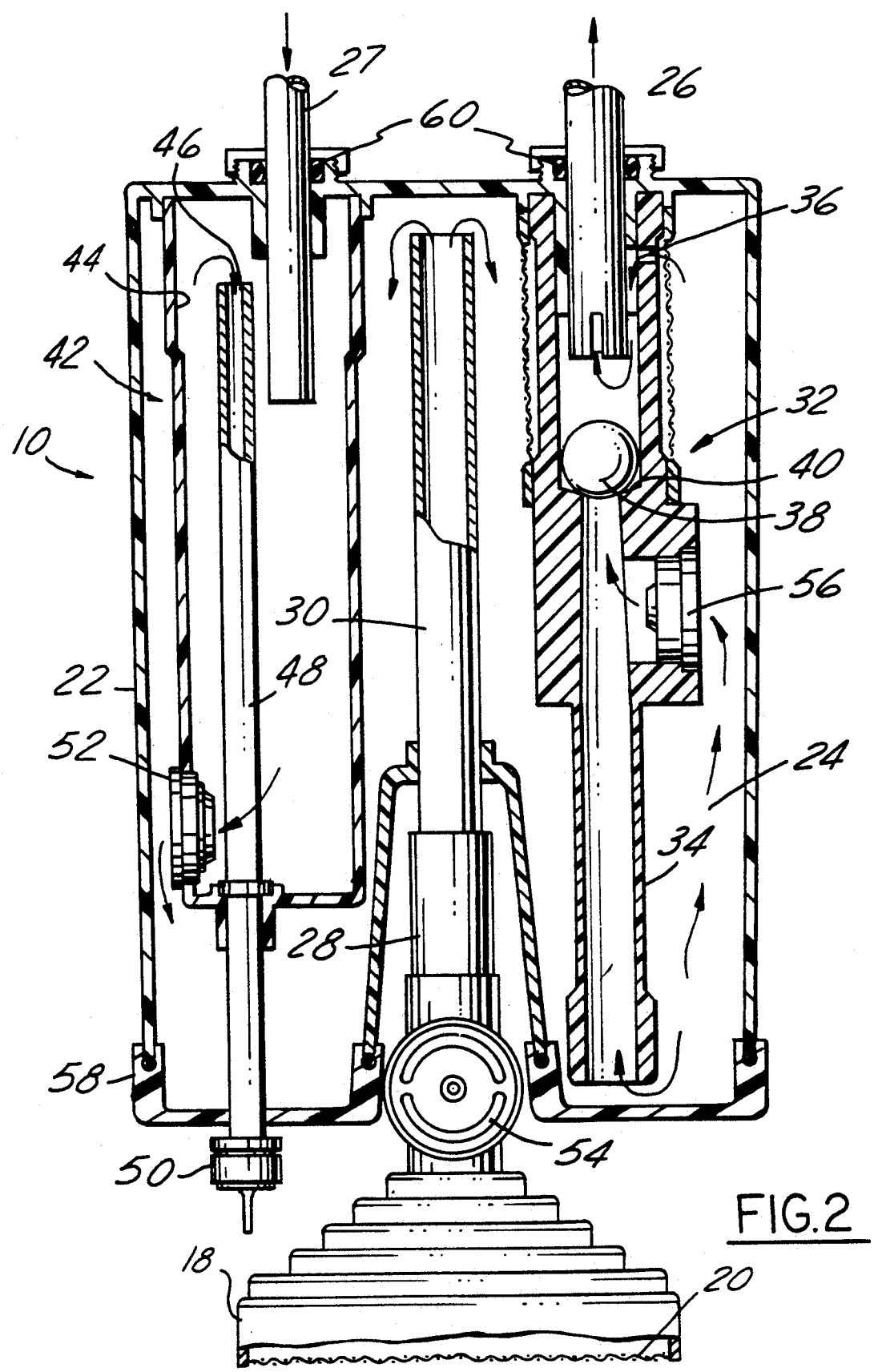
FIG. 2 is a sectional view, partially broken away, of a fuel pickup and reservoir system according to an aspect the present invention.

Turning now to FIG. 2 and beginning with the bottom of the fuel pickup and reservoir assembly, fuel enters the assembly through screen 20, which is mounted at the lower extremity of lift boot 18. In the event that ice accumulates in the fuel tank and freezes in the bottom of the tank so as to block screen 20, suction which would normally pull the fuel past screen 20 will move the fuel through lift boot ice valve 54. In other words, fuel will flow inwardly through ice valve 54 and into entrance pipe 28. Ice valve 54 is normally closed; it opens only when lift boot 18 is blocked. Moving through entrance pipe 28, the fuel passes through standpipe 30 and falls from the top of the standpipe into storage volume 24 located within canister 22. Because the top of standpipe 30 is located some distance above the bottom of storage volume 24, the internal combustion engine attached to the present fuel pickup and reservoir assembly will be able to run even if lift boot 18 is not submerged in liquid fuel. This situation could occur if a vehicle were parked on an extreme incline, or during certain cornering or other types of operating maneuvers. Moreover, those skilled in the art will appreciate that a reservoir having the attributes described herein could be remotely mounted from the fuel tank of an internal combustion engine, particularly in a vehicle. For example, a reservoir according to the present invention could be mounted in the engine compartment of a vehicle and thereby located some distance from the main fuel tank.

After falling to the bottom of storage volume 24, fuel will be drawn up through draft tube 34 so as to allow the engine to run. Draft tube 34 extends from the upper part of storage volume 24 to the lowermost part of the storage volume, which is defined by annular cap 58.

At the same time that fuel is passing up through the bottom of draft tube 34, fuel also will be caused to rise within storage volume 24 because purge passage 36, which communicates the upper portion of draft tube 34 with storage volume 24, will cause a vacuum to be pulled on the surface of the liquid within storage volume 24. The vacuum applied to the surface of the liquid fuel within storage volume 24 will be greater than the vacuum available at the lower opening of draft tube 34 because ball 38, which mates with seat 40, will limit the vacuum applied to the lowermost opening of draft tube 34. Eventually, the fuel level will rise to the upper level of purge passage 36. Once this level is reached, fuel will enter fuel supply line 26 through purge passage 36, as well as through draft tube 34. Those skilled in the art will appreciate in view of this disclosure that the check valve comprising ball 38 and seat 40 could be formed by a spring-loaded diaphragm or other type of valve known to those skilled in the art and suggested by this disclosure. Those skilled in the art will further appreciate in view of this disclosure that the size of ball 38, as well as its density, affects the filling rate of storage volume 24 by increasing or decreasing the strength of the vacuum at purge passage 36.

In the event that ice blocks the lower portion of storage volume 24, draft tube ice valve 56, which is normally closed and which opens inwardly, will allow fuel to enter into supply line 26 without passing through the lowermost opening in draft tube 34.

Standpipe 30 provides an additional advantage inasmuch as it will maintain the level of fuel within storage volume 24 when the engine is not operating, even if O-ring seals 60 located at the top of canister 22 and which surround fuel supply line 26 and fuel return line 27 should somehow lose integrity and cause a leak. In the absence of standpipe 30, an air leak in either of the seals 26 or 28 could cause fuel to leak back to the tank, thereby emptying storage volume 24.

Purge passage 36 is sized such that the amount of air allowed to pass through the passage will not overwhelm the engine's usual fuel/air separator (not shown). Accordingly, even if the fuel tank 12 is run dry, the fuel system will be allowed to prime itself and purge air once lift boot 18 is submerged in liquid fuel because ball 38 will prevent excessive air from being picked up by the lower part of draft tube 34, and purge passage 36 will not allow excessive air to flow while the fuel level is being brought up in storage volume 24. Once storage volume 24 is completely filled, a greater level of vacuum will be applied to the fuel at the bottom of draft tube 34 because relatively more viscous fuel, rather than air, will be passing through purge passage 36.

For a fuel system handling a maximum flow of 20 gallons of No. 2 diesel fuel per hour, it has been determined that a purge passage having a diameter of approximately 0.020 inches works satisfactorily when combined with a ball 38 of steel and having a diameter of approximately 0.50 inches, and with seat 40 having an opening diameter of approximately 0.25 inches. Those skilled in the art will appreciate in view of this disclosure that a system according to the present invention could be employed with other types of liquid fuel, with the dimensions cited above adjusted accordingly.

Although a fuel pickup and reservoir according to the present invention may be used without a separator operatively associated with return line 27, FIG. 2 does illustrate such a separator because a separator is useful for more quickly filling storage volume 24. Fuel returning through line 28 falls into cup 44 and eventually cup 44 is filled with a mixture of solid fuel at its lower extremity. The solid fuel is allowed to move out through exit port 52, which comprises a normally closed pressure relief valve. Fuel which is contaminated with air will flow back into fuel tank 12 through upper exit port 46, which is located at the top of exit standpipe 48. Note that standpipe 48 extends from the upper part of cup 44 through the bottom of both cup 44 and canister 22. A duck bill, 50, is located on the bottom of exit standpipe 48 for the purpose of avoiding the backflow of fuel into return line 27.

Exit port 46 is sensitive to high velocity flows which are encountered when excessive amounts of air are mixed into fuel and the exit port causes pressure build-up within cup 44. It has been determined that the pressure relief valve comprising lower exit port 52 will function well when allowed to open at approximately 0.5 p.s.i.

As an alternative to separator 42, fuel could be returned from line 29 directly to the fuel tank without passing through fuel pickup and reservoir assembly 10.

Figure 3:
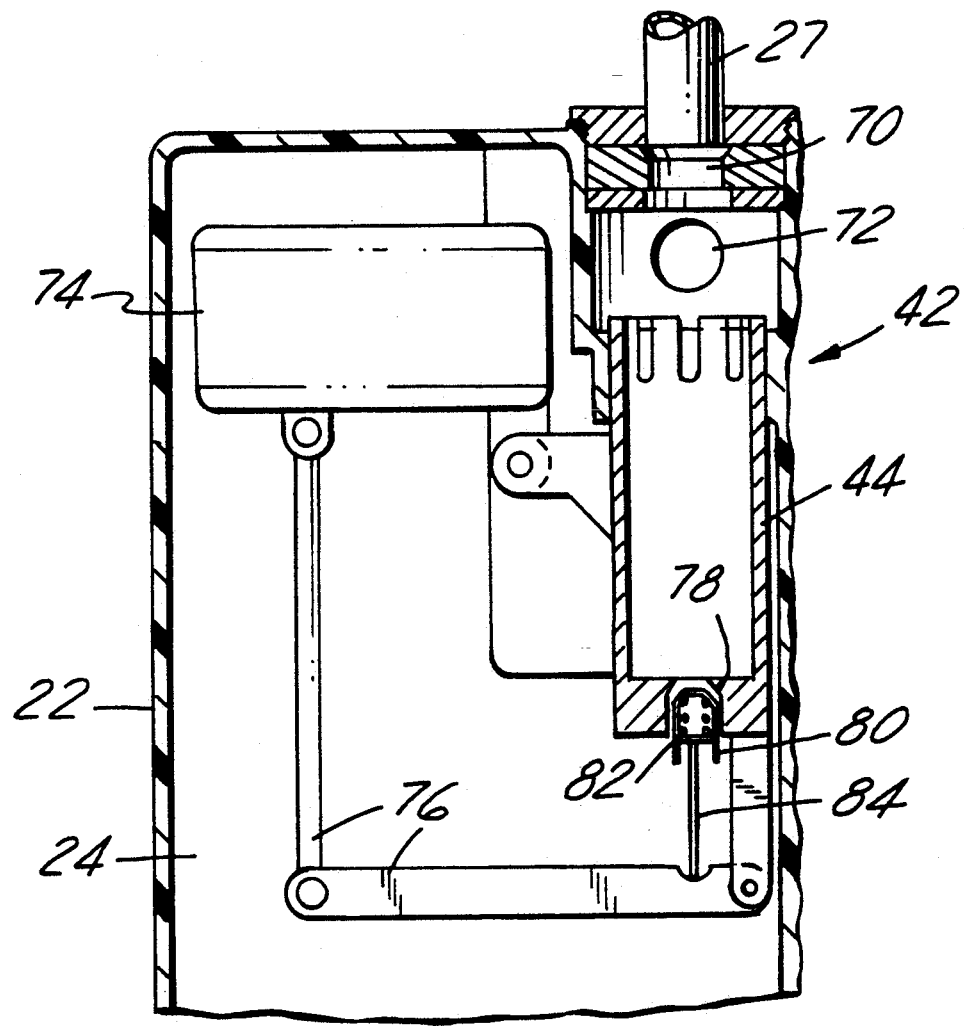
FIG. 3 is a sectional view, partially broken away, showing a fuel/air separator according to an aspect of the present invention.

FIG. 3 illustrates another type of separator 42 according to an additional aspect of the present invention, in which a float-operated valve comprises the exit port from the separator cup. Fuel returns to the reservoir system through inlet port 70, which is connected with return line 27. In the event that the fuel level within storage volume 24 is sufficiently low to allow float 74 to drop, linkage 76 will pivot as the float drops, allowing plunger 84 to drop, which will in turn allow spring 82 and hollow needle 80 to drop. When needle 80 is allowed to move away from seat 78, fuel which is trapped within cup 44 will be allowed to flow past needle 80 and into storage volume 24. In the alternative event that the level of fuel within storage volume 24 is sufficient to keep float 74 at an elevated position such that needle 80 is maintained in contact with seat 78, the fuel will exit cup 44 through tank port 72. Although not shown, a duckbill similar to duckbill 50 (FIG. 2) could be provided for preferentially closing tank port 72.

I claim:

1. A fuel reservoir system for an internal combustion engine, comprising:
   a canister having a storage volume for holding fuel;
   at least one fuel supply line extending from the canister to the engine;
   at least one fuel return line extending from the engine to the canister;
   an entrance pipe for conducting raw fuel into the canister; and
   an exit pipe, operatively connected with said fuel supply line, for conducting fuel from the canister to the fuel supply line, with said exit pipe comprising:
   a draft tube extending from the upper part of the storage volume into the lower part of the storage volume;
   a purge passage communicating the upper portion of the draft tube with the storage volume; and
   a flow restrictor mounted in the draft tube upstream of the purge passage.

2. A fuel reservoir according to claim 1, further comprising a separator operatively associated with said return line, for removing air from the return fuel flow and for allowing the separated fuel to be added to the fuel within the storage volume.

3. A fuel reservoir according to claim 2, wherein said separator comprises a cup into which the return line discharges, with said cup having an upper exit port for fuel contaminated with air and lower exit port for solid fuel.

4. A fuel reservoir according to claim 3, wherein said lower exit port comprises a pressure relief valve.

5. A fuel reservoir according to claim 3, wherein said lower exit port comprises a float operated valve.

6. A fuel reservoir according to claim 1, wherein said entrance pipe comprises a standpipe extending into the storage volume.

7. A fuel reservoir according to claim 6, wherein said entrance pipe further comprises a lift boot attached to the lower portion of said standpipe and having a fuel screen and ice valve attached thereto.

8. A fuel reservoir according to claim 1, wherein said exit pipe further comprises an ice valve mounted in the draft tube upstream of the flow restrictor.

9. A fuel reservoir according to claim 1, wherein said flow restrictor comprises a check valve.

10. A fuel pickup and reservoir system for an internal combustion engine, comprising:
    a canister having a storage volume for holding fuel;
    at least one fuel supply line extending from the canister to the engine;
    at least one fuel return line extending from the engine to the canister, with said return line comprising a separator for removing air from the return fuel flow and for allowing the separated fuel to be added to the fuel within the storage volume;

an entrance pipe for conducting raw fuel into the canister, with said entrance pipe comprising a standpipe extending into the storage volume and a fuel screen attached to the lower portion of said standpipe; and an exit pipe, operatively connected with said fuel supply line, for conducting fuel from the canister to the fuel supply line, with said exit pipe comprising:

a draft tube extending from the upper part of the storage volume into the lower part of the canister;

a purge passage communicating the upper portion of the draft tube with the storage volume; and a flow restrictor mounted in the draft tube upstream of the purge passage.

11. A fuel reservoir according to claim 10, wherein said flow restrictor comprises a check valve.

12. A fuel reservoir according to claim 10, wherein said separator comprises a cup into which the return line discharges, with said cup having an upper exit port for fuel contaminated with air and lower exit port for solid fuel, wherein said upper exit port is contained in an exit standpipe extending from the upper part of the cup through the bottoms of both said cup and said canister.

13. A fuel system for an internal combustion engine, comprising:

a fuel tank;

a canister mounted within said fuel tank and having a storage volume for holding fuel;

at least one fuel supply line extending from the canister to a fuel pump;

at least one fuel return line extending from the engine to the canister, with said return line comprising a separator for removing air from the return fuel flow and for allowing the separated fuel to be added to the fuel within the storage volume;

an entrance pipe for conducting raw fuel into the canister, with said entrance pipe comprising a standpipe extending into the storage volume and a fuel screen attached to the lower portion of said standpipe; and an exit pipe, operatively connected with said fuel supply line, for conducting fuel from the canister to the fuel supply line, with said exit pipe comprising:

a draft tube extending from the upper part of the storage volume into the lower part of the storage volume;

a purge passage communicating the upper portion of the draft tube with the storage volume; and a flow restrictor mounted in the draft tube upstream of the purge passage.

14. A fuel reservoir according to claim 13, wherein said flow restrictor comprises a check valve.

15. A fuel pickup and reservoir system situated within the fuel tank of an internal combustion engine, comprising:

a canister having a storage volume for holding fuel;

at least one fuel supply line extending from the canister to the engine;

an entrance pipe for conducting raw fuel into the canister, with said entrance pipe comprising a standpipe extending into the storage volume; and an exit pipe, operatively connected with said fuel supply line, for conducting fuel from the storage volume to the fuel supply line, with said exit pipe comprising:

a draft tube extending from the upper part of the storage volume into the lower part of the storage volume;

a purge passage communicating the upper portion of the draft tube with the storage volume; and a flow restrictor mounted in the draft tube upstream of the purge passage.

16. A fuel reservoir according to claim 15, wherein said flow restrictor comprises a check valve.

* * * * *